United States Patent [19]

Matsui et al.

[11] Patent Number: 4,672,543
[45] Date of Patent: Jun. 9, 1987

[54] DATA TRANSMISSION CONTROL APPARATUS IN LOCAL NETWORK SYSTEMS

[75] Inventors: Yoshimitsu Matsui, Kashihara; Michiyuki Horiguchi, Nara; Masakazu Ohashi, Kyoto, all of Japan

[73] Assignee: Sharp Kabushiki Kaisha, Osaka, Japan

[21] Appl. No.: 525,665

[22] Filed: Aug. 23, 1983

[30] Foreign Application Priority Data

| Aug. 31, 1982 [JP] | Japan | 57-152979 |
| Aug. 31, 1982 [JP] | Japan | 57-152980 |
| Aug. 31, 1982 [JP] | Japan | 57-152981 |
| Aug. 31, 1982 [JP] | Japan | 57-152982 |
| Aug. 31, 1982 [JP] | Japan | 57-152983 |
| Aug. 31, 1982 [JP] | Japan | 57-152984 |
| Aug. 31, 1982 [JP] | Japan | 57-152985 |

[51] Int. Cl.$^4$ ............................................. G06F 13/36
[52] U.S. Cl. .................................................. 364/200
[58] Field of Search ... 364/200 MS File, 900 MS File; 370/60, 85, 94; 455/14, 73

[56] References Cited

U.S. PATENT DOCUMENTS

| Re. 31,319 | 7/1983 | Fraser | 364/200 |
| 4,400,778 | 8/1983 | Vivian et al. | 364/200 |
| 4,411,007 | 10/1983 | Rodman et al. | 455/51 |
| 4,534,024 | 8/1985 | Maxemchuk et al. | 370/85 |

Primary Examiner—Thomas M. Heckler
Attorney, Agent, or Firm—Birch, Stewart, Kolasch & Birch

[57] ABSTRACT

A local network system interconnects computer devices, such as cash registers, scattered in a relatively small area. The local network system includes reception control element for determining the packet format of data received from a data transmission line and forming a response packet based on the result of the determination; a transmission control element for delivering data that is to be transmitted, or the response packet, in a prescribed packet format over the transmission line, and transmission and reception control elements for controlling the transfer of transmitted and received data between the reception and transmission control elements and terminal devices. Access to the transmission line, generation of packets, data buffering, retransmission control and other operations are effected not at high level or an application program level, but at the level of an interface or data transfer control apparatus that interconnects the terminal device serving as a main system.

10 Claims, 19 Drawing Figures

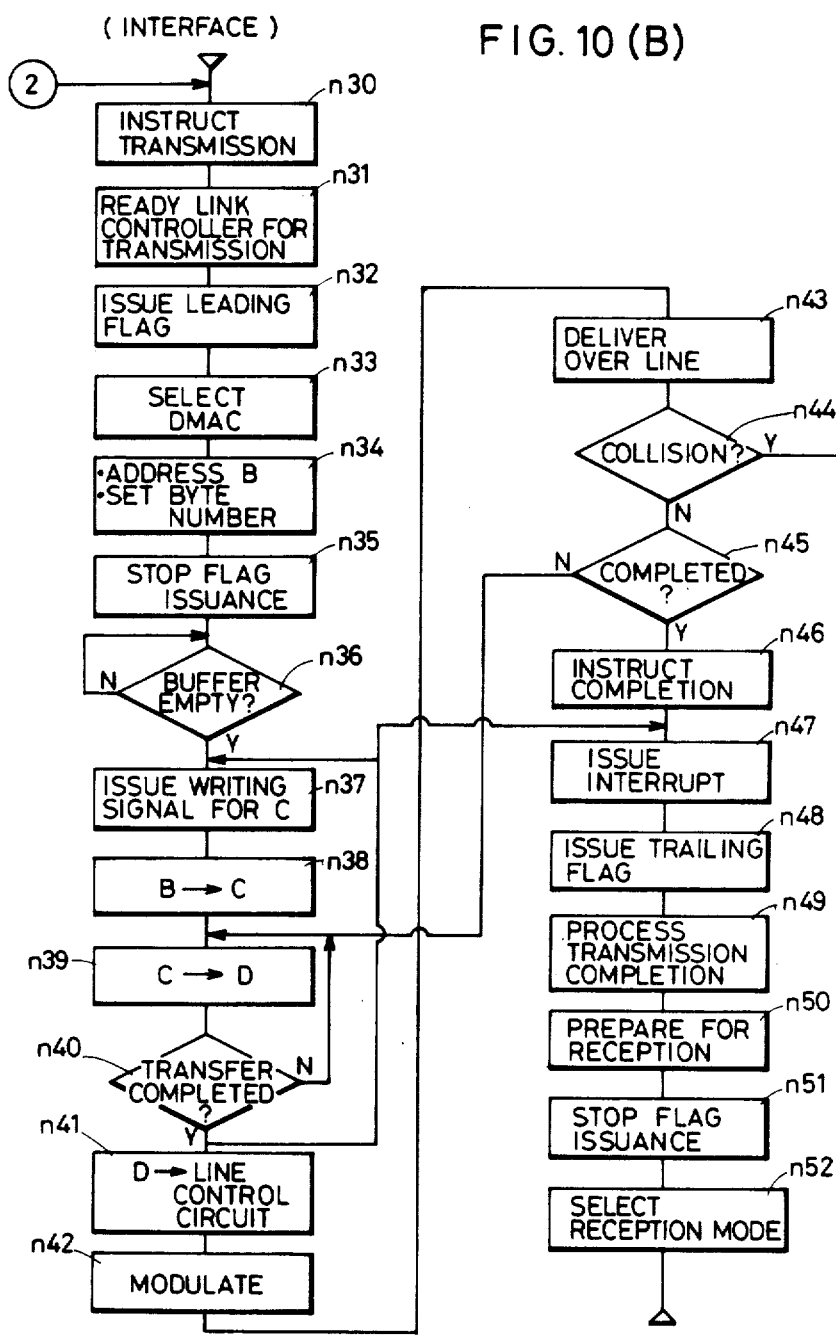

DATA TRANSMISSION CONTROL APPARATUS IN LOCAL NETWORK SYSTEMS

BACKGROUND OF THE INVENTION

The present invention relates to a local network system for interconnecting computer devices, such as cash registers, scattered in a relatively small area, and more particularly to a data transmission control device in such a local network system for controlling buffering of data, assembly and disassembly of packets, access to the network system, and other operations.

Data transmission control is effected in a local network system generally as described below. Each one of a plurality of reception terminals connected to a transmission line reads a destination terminal address contained in a header part of a data packet, and, if the address agrees with an address of its own, it reads the succeeding data. If no error is detected in the data as a result of a CRC (Cyclic Redundancy Codes) check, then the terminal sends an ACK (acknowledge) packet back to the transmission terminal. If the data contains an error, then the received data is discarded. The transmission terminal measures time with a timer after it has transmitted the data packet, and transmits the data packet once again when no ACK packet is received within a certain period of time. For stricter data transmission control, the transmission terminal transmits a RACK packet to the reception terminal when an ACK packet is received.

The forgoing data transmission control has heretofore been executed by an application program stored in each terminal. A controller which connects a main system in each terminal to the transmission line has merely disassembled packets and effected data level conversion (conversion of voltage and logic levels). However, the application program required has increased the burden on the main system, resulting in a reduction in the efficiency of performing a task. Since retransmission of data and generation of packets are carried out by a hierarchically high application program, error correction and data collision prevention cannot be effected efficiently and speedily, and the data transmission control has had no sufficient reliability and high-speed operation.

A collision occurs on the transmission line when a plurality of terminals simultaneously access a transmitted data packet. To cope with this, any data transmission over the transmission line is prohibited immediately after such a collision has been detected, and upon elapse of a prescribed interval of time, the transmission line is opened to permit the data packet to be transmitted again. This mode of control is usually called "back-off processing" in which a back-off timer value for controlling a time until the data packet is transmitted again is picked up from a table of random numbers, possessed by each terminal, each time a collision takes place.

The prior back-off processing has individually detected elimination of a carrier signal in each terminal, and started the timer on such detection. However, if the back-off timer is started only on the condition that there is no carrier signal on the line, then the time required for transmitting the ACK and RACK packets subsequently to the transmission of the data packet is included in a period of time set by the back-off timer. This gives rise to the possibility of these response packets colliding with any data packet retransmitted upon elapse of the time set by the back-off timer. Since the terminals which have caused a collision separately start the back-off timers, the probability that the time intervals set by the timers do not elapse simultaneously is not reduced, and hence the accuracy of the back-off processing cannot be increased.

When a reception buffer is full, any data to be transmitted which is of higher priority cannot successfully be transmitted and the transmission line becomes initialized, resulting in an increase in the period of time it takes for the empty reception buffer to receive subsequent data. The controller has only one reception buffer so that the data will be processed in the terminal device in the order they have been received. This is disadvantageous in that any data of higher priority cannot be processed immediately.

An ACK error occurs when an ACK packet is received by the transmission terminal which has not yet been readied for receiving such an ACK packet after it has transmitted a data packet. To prevent this error, it is necessary to synchronize operation modes of the transmission and reception terminals. It has been customary to allow a data packet reception terminal to provide a fixed idle or delay time after a data packet has been received, and then to send a response packet upon elapse of such a fixed idle time.

This system however has a drawback in that the delay time is generated irrespective of the operation mode of the transmission terminal, and no response packet may be transmitted even when the transmission terminal is ready to receive such a packet. Such a situation manifests itself where there are various terminals of low- and high-speed operation. The idle time should be matched for the terminal which operate at the lowest speed, and the idle time may become relatively too long for the time required for a high-speed transmission terminal, which transmits a data packet, to be readied for receiving a response packet. Therefore, the data transmission control system of the type described has required the terminals to be matched in performance and cannot increase a transmission efficiency.

A system which utilizes a packet format with flags attached to the beginning and terminal ends of a data packet enables a reception terminal to determine the completion of reception of the packet by detecting the flag at the terminal end of the data packet during the foregoing data transmission control. When the terminal flag is detected, the reception terminal prepares for transmitting a response packet such as an ACK packet or an NRDY packet to the terminal having transmitted the data packet.

The above data transmission control however tends to cause the reception terminal to fail to normally receive the retransmitted packet when there is a collision at the time of data packet transmission. This is because data transmission is interrupted when a collision occurs and a reception terminal is brought into a condition waiting for data at the time of interruption of data transmission, and that reception terminal will process any retransmitted data packet as being contiguous to the data previously received. More specifically, the starting flag of any retransmitted data packet is regarded as the ending flag of the preceeding data packet (which has been cut off), and the data is processed as being subjected to an error due to a reduced data length. The retransmitted data packet which is successively received is also processed as an error data packet since it is interpreted as containing no starting flag. As a consequence, the retransmitted data packet after the collision cannot be properly received by the reception terminal.

SUMMARY OF THE INVENTION

It is an object of the present invention to provide a data transmission control apparatus in local network systems which reduces the burden on a host, such as a terminal device, is highly responsive, and is capable of efficient packet transmission control.

Another object of the present invention is to provide data transmission control apparatus in local network systems which is capable of easily preventing packet collisions.

Still another object of the present invention is to provide data transmission control apparatus in local network systems which processes as an error a data packet which is interrupted in transmission upon packet collision without affecting transmission of a retransmitted data packet, and properly receives the retransmitted data after the error processing.

Still another object of the present invention is to provide a power-failure processing apparatus in data transfer systems which effects data transfer control while preventing a phase difference between a data transmission control apparatus and terminal devices when a power failure occurs and when a power supply is restored.

A still further object of the present invention is to provide a data transmission control system capable of most efficient transmission of data to a plurality of terminals connected to a transmission line and having different operation speeds.

A still further object of the present invention is to provide a data transmission control apparatus in local network systems which is capable of sucessively processing received data in order of higher priority according to demands from terminal devices.

Briefly summarized, a local network system according to the present invention includes reception control means for determining the packet format of data received from a data transmission line and forming a response packet based on the result of determination, transmission control means for delivering data to be transmitted or the response packet in a prescribed packet format over the transmission line, and transmission and reception control means for controlling transfer of transmitted and received data between the reception and transmission control means and terminal devices. Access to the transmission line, generation of packets, data buffering, retransmission control and other operations are effected not at a high level or an application program level, but at the level of an interface or data transfer control apparatus interconnecting the terminal device serving as a main system. Since control over data transmission is directly effected by a data transmission control apparatus, the control for conversion between reception and transmission modes and preparation for response based on assembly and disassembly of packets in the respective modes can be performed at a high speed. This allows collision prevention means necessary for transmission control in a common-channel system, in which the network is accessible randomly by terminals, to be implemented by simple hardware without regard to an application program. Since the host no longer needs an application program for transmission control, task control is simplified.

Further according to the present invention, the reception control means has a plurality of reception buffers for storing received data according to channel numbers designated by header parts of data packets, so that the received data will be assigned to the reception buffers according to their types or priorities. Since data of high and low priorities can be separately buffered, the terminal devices can receive any desired data from the reception buffers to meet the requirement of a particular task. With the reception buffers provided in the reception control means, there is no possibility of a buffer-full condition which would otherwise result in a data reception failure even if the terminal devices have a low processing speed. This increases a transmission efficiency and allows the terminal devices to operate at low speeds.

According to another aspect of the present invention, a maximum time T is required to transmit a response packet after a data packet has been received, and there is provided a collision prevention circuit for inhibiting transmission of a new data packet until a prescribed period of time longer than the time T elapses after no carrier signal is generated from the time at which a carrier signal has been detected over the transmission line. The collision prevention circuit thus inhibits transmission of a new data packet while an ACK packet is received after the data packet has been transmitted and also while a RACK is transmitted. The transmission line is accessible for transmitting the new data packet upon elapse of the above prescribed period of time after the RACK packet has been received.

On a collision, the respective terminals select back-off timer values which are started immediately after the period of time in which the data packet transmission is inhibited has elapsed. The terminal in which the back-off timer value has elapsed at first attempts to retransmit the data packet. If the transmission line has already been accessed by a terminal which has not previously caused a collision, then no data retransmission can be effected with a signal from the collision prevention circuit, and the terminal waits for next data retransmission. However, a terminal which has caused a previous collision is incapable of data transmission as the back-off timer is still in operation, and there is no danger of colliding with this terminal. Thus, the terminal which has selected the shortest back-off timer value transmits a data packet again, and if the data packet transmission is successful, then the terminal having selected the second shortest back-off timer value retransmits a data packet. Accordingly, the transmission of a new data packet is inhibited until the above period of time (longer than the maximum time required until a response packet is transmitted after the packet has been received) elapses after no carrier signal is generated from the time at which a carrier signal is detected over the data transmission line, and the back-off timers are started simultaneously during the above inhibition time, with the result that operation of the back-off timers does not overlap transmission of response packets such as ACK packets. Because the back-off timer values selected by the terminals having caused a collision are simultaneously started, the possibility that the times set by the timers elapse simultaneously is extremely small. This increases the accuracy of back-off processing operation.

The above objects of the invention can be achieved also by providing control information storing means in the data transmission control apparatus for storing the control condition of the data transmission control apparatus in the terminal as the main system. The storing means is composed of a flag indicative of the completion of transfer of one-block data which is an example of black control information, and is set by the main system. The storing means functions on a power failure to at least store control information at the time of the power failure. The control information may be renewed and stored during a normal period. The data transmission control apparatus further includes battery back-up storing means for saving and storing the above control information when informed of a power failure by the terminal device. The control information at the time of a power failure is stored by a memory backed up by a battery and can be referred to in data transfer control when the power supply is restored. There are provided for the terminal device, power-failure processing completion determining means for determining the completion of power-failure processing of the data transmission control apparatus, after power-failure processing has been completed, and means for resetting the terminal and the data transmission control apparatus when power-failure processing is determined by the determining means. The terminal and the data transmission control apparatus are reset and the power supply is turned off when power-failure processing on both of them is completed.

The above objects of the invention can also be achieved by transmitting successive leading flags of a packet for a certain period of time when the packet is transmitted. More specifically, with the successive leading flags attached, the receiving terminal regards the first leading flag of a packet retransmitted after a collision as a trailing flag of the previous packet, and an error is processed while the leading flags are being successively transmitted. After the error processing has been finished, the data following the leading flags received thereafter is properly received. Therefore, even when a collision of data packets occurs, the receiving terminal can process an error for the data (containing at least leading flags) received prior to the collision without affecting a retransmitted packet, and hence can receive data properly at all times. Since the error processing can be effected while flags are being fed out, any data packets retransmitted after a collision can be received without fail.

To further achieve the objects of the present invention, trailing codes of a packet are successively transmitted until preparation for reception is completed when the packet is transmitted, so that a response packet is transmitted by a receiving terminal when the trailing codes are completely received. Since the response packet is transmitted by the receiving terminal when the transmitting terminal is readied for receiving data packets, the receiving terminal needs no idling process for transmitting the response packet and can transmit the response packet with a high degree of efficiency. Another advantage is that the terminals operate in mutual synchronism, and the operation speeds of the terminals connected to the network system are of no importance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION

Figure 15:
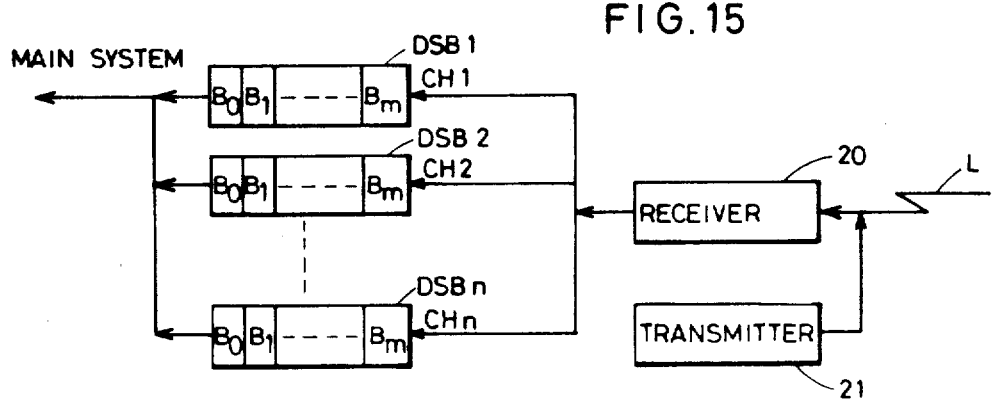
FIG. 15 is a schematic diagram showing the data transmission control apparatus of the present invention.

A data transmission control apparatus according to the present invention will be described with reference to FIG. 15.

A data packet on a transmission line L is disassembled in a receiver 20 and data is transferred to one of reception buffers DSB1-DSBn through a corresponding channel specified by a header part of the data packet. Each reception buffer DSB functions as a received-data saving buffer for saving data from a buffer (not illustrated) contained in the receiver 20. The reception buffer DSB has at a capacity of m bytes at maximum with data stored in data transfer areas successively from a data transfer area B0 for the first byte. A main system operates under an application program being executed to pick up data from a desired one of the reception buffers DSB1-DSBn.

The receiver 20 sends a buffer-full response back to the transmission terminal (as described later) if the reception buffer corresponding to the channel specified by the header part of the data packet is full. If the reception buffer is empty, then the receiver 20 transmits an ACK packet and transfers the received data to the reception buffer corresponding to the specified channel. The receiver 20 controls data transmission independently of operation of the terminal devices. A transmitter 21 operates when transmitting data packets and response packets.

Figure 1:
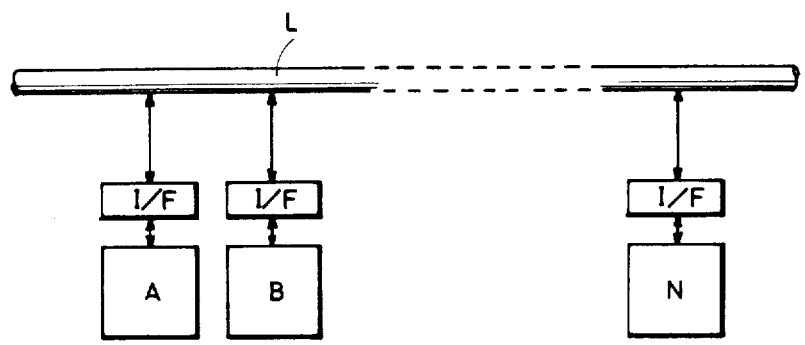
FIG. 1 is a block diagram of a local network system in which the present invention is incorporated.

An embodiment of the present invention will now be described. FIG. 1 shows, in block form, a local network system incorporating the principles of the present invention. Terminals devices A-N, which are independently operable main systems, are connected to a data transmission line composed of a coaxial cable through transmission interfaces I/F (data transmission control apparatus) according to the present invention for transmission and reception of various data as desired between the terminal devices.

Figure 2:
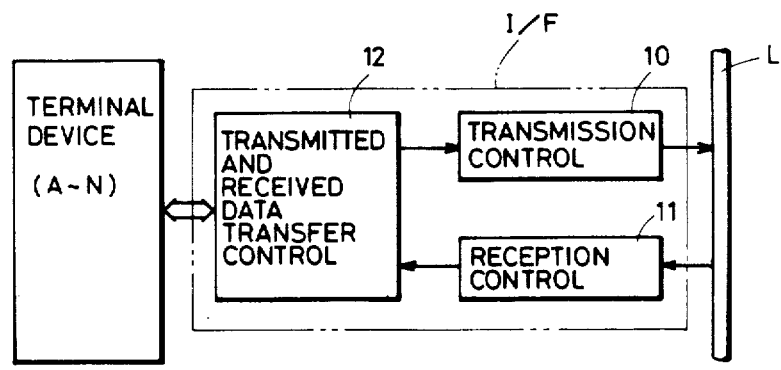
FIG. 2 is a block diagram of a transmission interface I/F.
Figure 3:
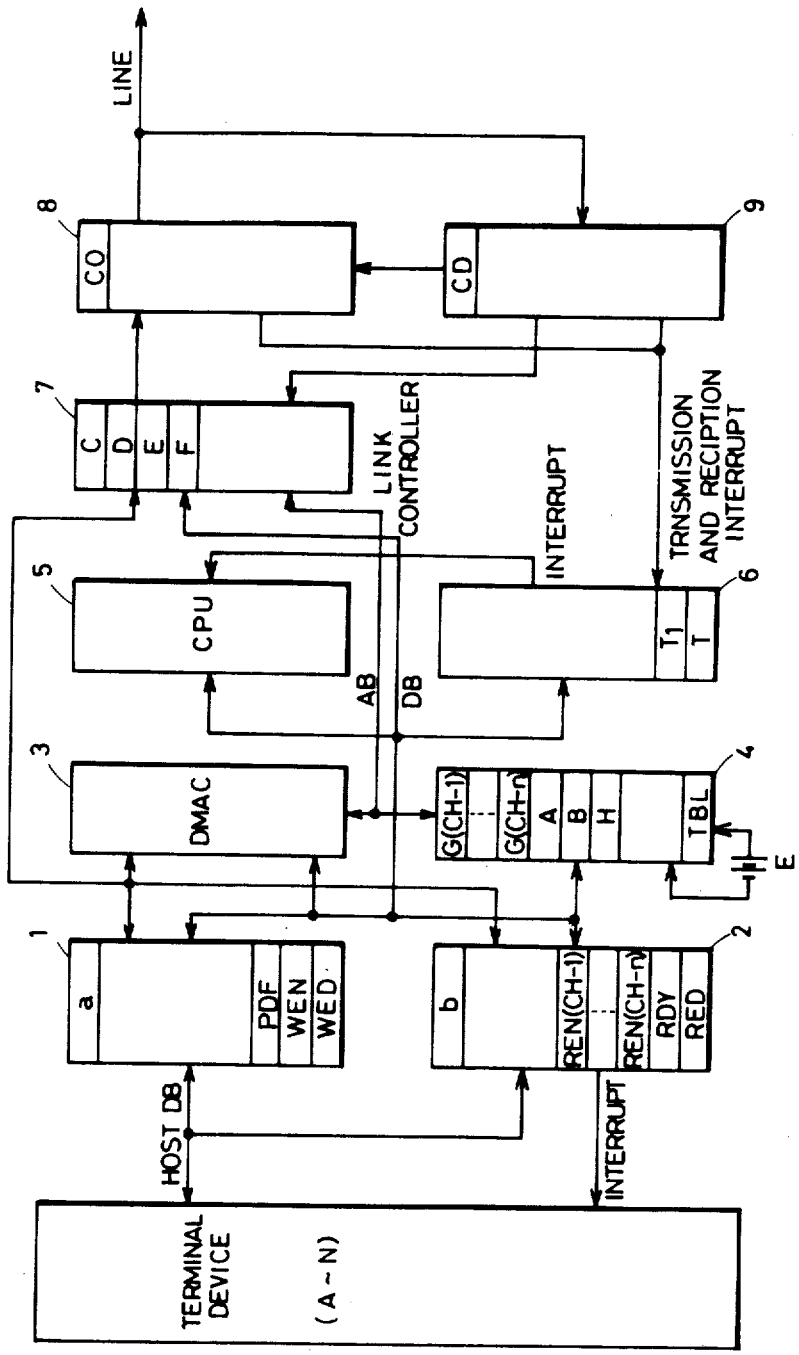
FIG. 3 is a detailed block diagram of the transmission interface.

FIG. 2 shows, in block form, each of the transmission interface I/F, and FIG. 3 illustrates the transmission interface I/F in detailed block form. The data transmission control apparatus of the present invention will hereinafter be referred to as the transmission interface I/F.

The transmission interface I/F is composed of a transmission control circuit 10, a reception control circuit 11, and a transmitted and received data transfer control circuit 12. The transmission control circuit 10 serves to feed transmission data or a response packet in a prescribed packet format over the transmission line L. The reception control circuit 11 serves to determine the packet format of data received from the transmission line L and prepares a response packet based on the result of packet format determination. The transmitted and received data transfer control circuit 12 controls transfer of transmitted and received data between the reception control circuit 11, the transmission control circuit 10, and the terminal devices.

As illustrated in FIG. 3, the transmitted and received data transfer control circuit 12 comprises a transmitted data transfer control circuit 1 and a received data transfer control circuit 2. The transmitted data transfer control circuit 1 has a register a for temporarily storing each byte of data transmitted from the terminal device, a flag WEN, reset when permitting data to be written into the register a, a flag WED, set when the terminal device has transferred all of the transmitted data, and a power failure flag PDF set by the terminal device upon a power failure. The received data transfer control circuit 2 has a register b for transferring each byte of data received by the interface to the terminal, a flag RDY set when permitting data to be read out of the register b, a plurality of flags REN, for informing the terminal device in each channel of any received data, and a flag RED, for informing the interface of the terminal device having taken in all of the received data.

The transmission control circuit 10 and the reception control circuit 11 are constructed of a memory 4 having a plurality of reception buffers G for storing received data in the respective channels, buffers A, B for storing data to be transmitted, a table TBL of random numbers for selecting a back-off timer value (described later), and an area H for saving and storing flags in the transmitted and received data transfer control circuit upon a power failure, the memory 4 storing an interface control program and being backed up by a battery E. The control circuits 10, 11 also have a control circuit 6 for controlling the timer and an interrupt function at the stage of transmission and reception; a DMAC 3 for transferring data in a DMA mode between the memory 4 and the transmitted and received data transfer control circuits 1, 2; a link controller 7 serving to control transmission and reception operation and having transmission and reception buffers C, F and transmission and reception shift registers D, E; a line control circuit 8 for modulating and issuing data over the transmission line at the time of transmission, the line control circuit 8 including a collision detector for detecting whether there are simultaneous access demands from a plurality of terminals; a line control circuit 9 for receiving a signal over the transmission line and demodulating and transferring the received signal to the link controller 7, and an auxiliary CPU 5 for controlling the entire interface under the control of the interface control program stored in the memory 4.

Figure 4:
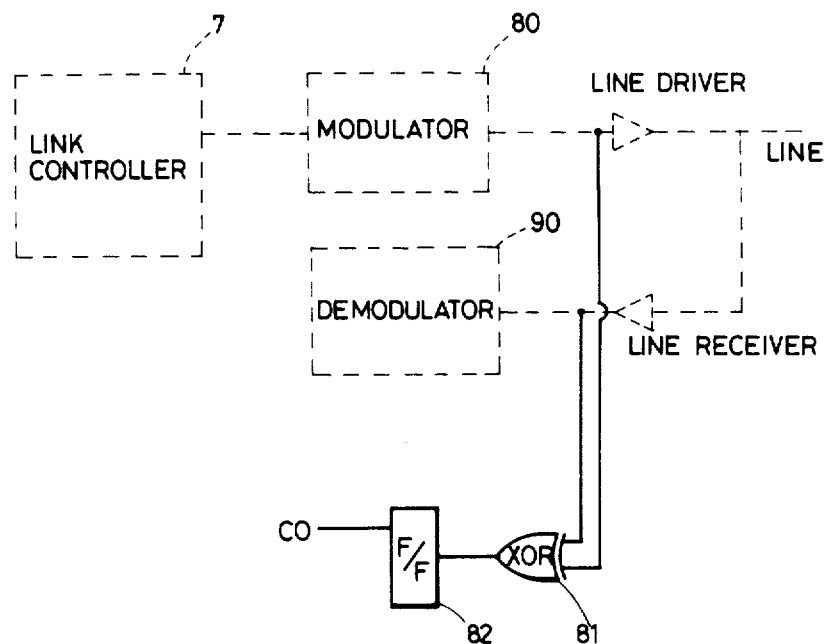
FIG. 4 is a block diagram of a collision detector in a line control circuit 8.

FIG. 4 shows a collision detector in the line control circuit 8. As shown in FIG. 4, a modulated signal and a signal to be demodulated are applied to an exclusive-OR gate 81 which produces an output signal employed as a set signal for a flip-flop 82. This arrangement generates a collision detection signal CO when the transmitted and received data are different from each other, that is, at the time of a collision.

Figure 5:
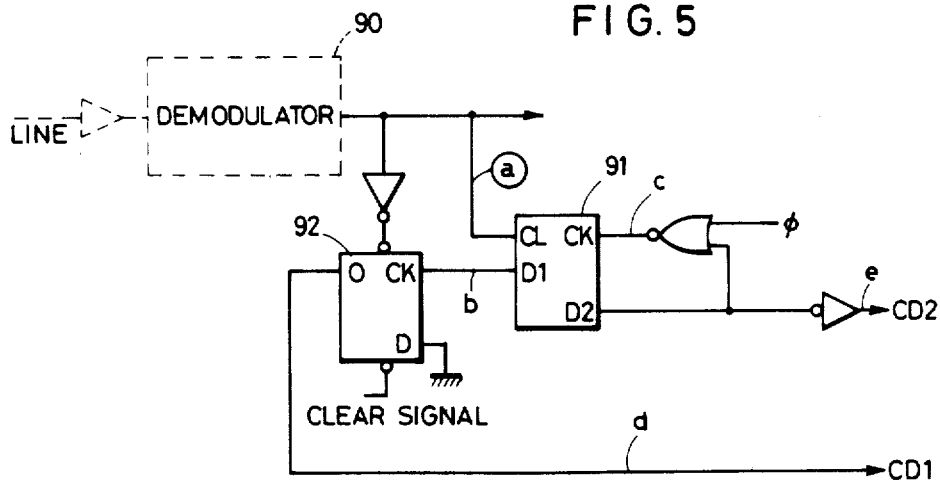
FIG. 5 is a block diagram of a carrier detector in a line control circuit 9.
Figure 6:
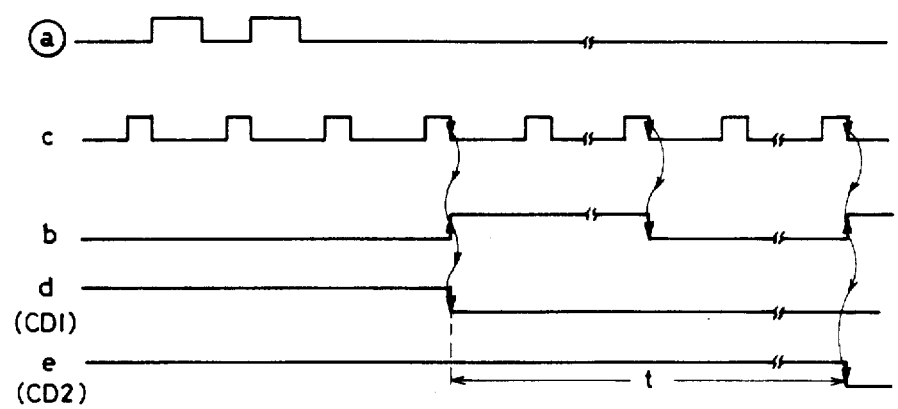
FIG. 6 is a timing chart of operation of the carrier detector.

FIG. 5 illustrates a carrier detector in the line control circuit 9, and FIG. 6 is a timing chart of operation of the carrier detector. The carrier detector serves to prevent packets from colliding with each other in transmission control. According to the illustrated embodiment, there are two signals generated; a carrier signal CD1 indicative of a data flow over the transmission line and a signal CD2 respresenentative of elimination of the carrier signal CD1 for a certain period of time. More specifically, a receive clock ⓐ is generated by a demodulator 90 from a signal received from the line and applied to a binary counter 91 and a latch circuit 92 for generating the signals CD1, CD2. As shown in FIG. 6, when there is no receive clock, a CL (clear) terminal of the binary counter 91 is released to enable the latter to go on counting with a basic clock $\phi$ for producing the carrier signal CD1 which is a mirror image signal of the carrier wave. As the counting by the binary counter 91 progresses further, the signal CD2 is generated which includes a processing time t set in advance by the period of the clock $\phi$.

Figure 7:
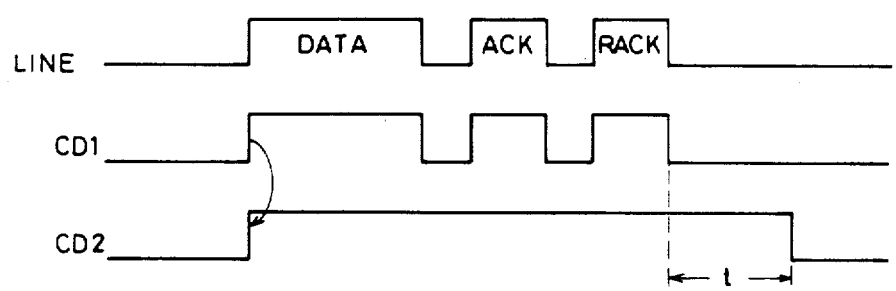
FIG. 7 is a timing chart showing the relationship between a signal on a line and signals CD1, CD2.

Each terminal individually detects the signals CD1, CD2, and is controlled by a circuit (not shown) to issue a data packet only when the signal CD2 is "low" (logic 0) and a response packet such as an ACK packet or an RACK packet only when the signal CD1 is "low" (logic 0). By thus controlling transmission and reception while checking the signals CD1 and CD2, the ACK and RACK packets issued after a data packet has been delivered out are prevented from colliding with data packets from other terminals. FIG. 7 shows the relationship between the signal over the line and the signals CD1 and CD2. A time t indicates a fixed time interval in which there is no carrier signal over the line. This time interval is longer than a time for permitting a response packet to be transmitted again. If no response packet is transmitted within the time interval t, then the line is freed and a new access from another terminal is permitted.

Figure 8:
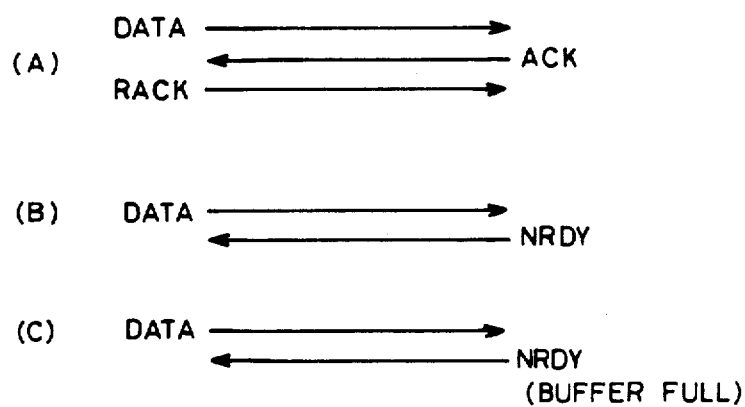
FIG. 8 is illustrative of basic transmission procedures for the local network.

FIG. 8 illustrates fundamental data transmission procedures to be effected in the local network. FIG. 8 shows at (A) a procedure to be taken when both the transmission and reception terminals are in a normal condition. A data packet having a header part such as a flag, an address or the like is transmitted from the transmission terminal to the reception terminal. When the data packet is received properly, the reception terminal transmits an ACK packet. The transmission terminal having received the ACK packet then transmits a response packet (RACK packet) responsive to the ACK packet. If the reception terminal is not readied for receiving any data packet transmitted, then the reception terminal transmits an NRDY packet as shown in FIG. 8 at (B), and the operation is brought to an end. If the reception buffer corresponding to the channel over which the data packet has been transmitted is full, the reception terminal transmits a NRDY packet with a buffer full statement as shown in FIG. 8 at (C), and the operation is ended.

Figure 9:
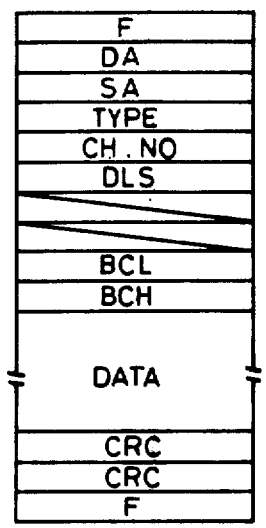
FIG. 9 is a diagram of a packet format.

FIG. 9 shows a packet format. The illustrated data packet has a format defining a set of data with a leading flag and a trailing flag. Both of the flags have codes 7E (hexadecimal digits). The trailing flag serves as a completion code representative of a terminal end of the packet. A destination address DA identifies a receiving station. A source address SA identifies a transmitting station. A data type TYPE specifies a type of a transfer frame, there being four frame types; data, ACK, RACK, and NRDY. A channel number CH. NO specifies a channel type of the packet. A circuit status DLS describes a statement at the time an NRDY packet is transmitted. Statements available include reception impossible and reception buffer full. Byte counters BCL, BCH identify the number of bytes of data. A data field DATA serves to set data to be transferred, the data field being present only in a data packet. CRC gives an error detecting code.

Operation of the interface shown in FIG. 3 will be described with reference to FIGS. 10 through 12. FIGS. 10 and 11 illustrate transmission and reception operations, and FIG. 12 shows a power-failure processing operation.

Figure 10A:
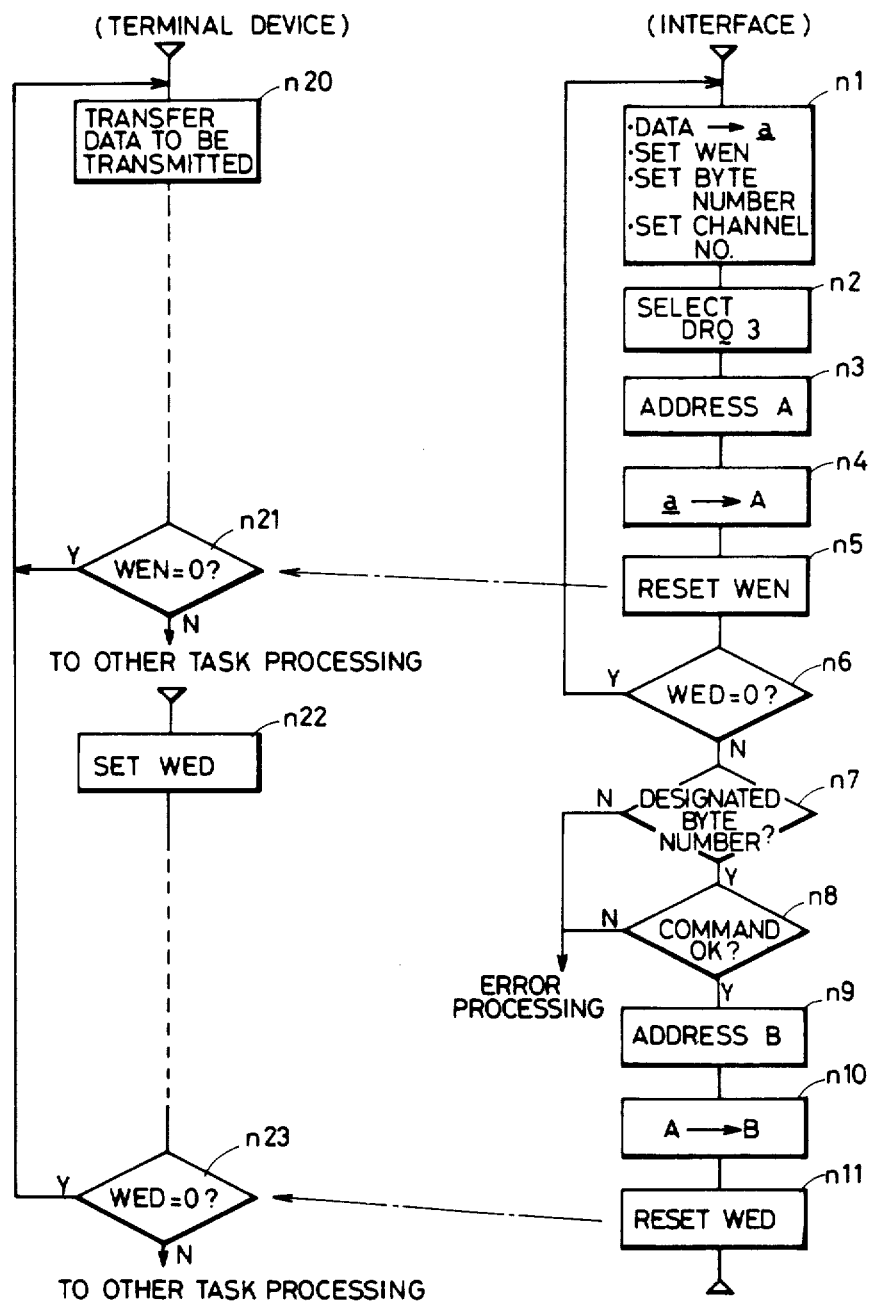
FIGS. 10(A) through 10(C) are a flowchart of operation of data transmission.
Figure 10:
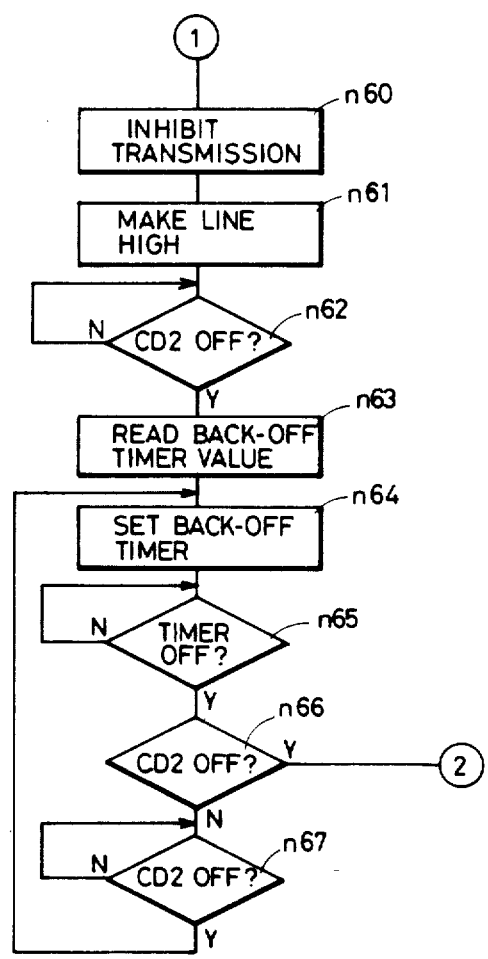

(1) Transmission:

FIGS. 10(A)-10(C) are a flowchart showing operation of data transmission.

It is now assumed that particular data is to be transmitted from the terminal device A to the terminal device N.

The terminal device A writes one-byte data into the register a in the transmitted data transfer control circuit 1 and sets the flag WEN in a step n1. At this time, the terminal device A also delivers the length of the transmitted data (byte number) and channel information CHn indicating which channel handles the data, together with the foregoing data, so as to be set in a prescribed area in the register.

The transfer control circuit 1 having received these data selects a DRQ3 channel (used for data transfer in the interface) which is a DMA transfer channel for the transmitted data, and commands the DMAC 3 for DMA transfer in a step n2. In response to this command, the DMAC 3 sets an address in the memory 4 to which data is to be transferred in a step n3, and the data in the register a is transferred to the transmission buffer A at that address in a step n4. When transfer of one byte is completed, the flag WEN is reset in a step n5. The terminal device A monitors the flag WEN, and, when the flag WEN is reset in a step n21, transfers the next one-byte data to the register a in a step n20. Thus, the terminal device A monitors the flag WEN and writes one-byte of data into the register a each time the flag WEN is reset. In the interface, the data in the register a are successively transferred in a DMA mode to the transmission buffer A under the control of the DMAC. When all of the data have been transferred, the terminal device A sets the flag WED in a step n22. When the flag WED is set, the control circuit 1 checks the number of bytes against the designated number of bytes in a step n7 and also checks a transmission command in a step n8. If the byte number and the transmission command are correct, then the program goes on to a step n9. In steps n9, n10, data is transferred from the buffer A to the buffer B, and a data packet is generated. After the data has been transferred, the flag WED is reset in a step n11 to indicate that the transmission buffer is empty. In response to the flag WED being reset, the terminal device A transfers any data to be transmitted to the buffer A in the manner described above.

The flag WED thus constitutes storage means for indicating an interface control status in the terminal device. More specifically, the flag WED as reset after data is transferred from the terminal device indicates a command for continuous transfer of current block data, and the flag WED as set after data transfer from the terminal device indicates that the block data has been transferred.

When data to be transmitted is prepared in the transmission buffer B, the CPU 5 for controlling operation of the interface instructs data transmission in a step n30 and brings the link controller 7 into a transmission ready condition in a step n31. At this time, the link controller 7 checks the signal CD2 generated by the carrier detector CD. If the signal CD2 is low, then the link controller 7 delivers the leading flag F which is the first data of the packet over the line through the line control circuit 8 in a step n32. Then, the CPU 5 sets a head address in the buffer B in the memory 4 and a data byte number in steps n33, n34, and instructs data transfer from the buffer B to the link controller 7. During this time, the link controller 7 delivers the leading flag F, and stops issuance of the leading flag F in a step n35 after the step n34 is over. The continuous issuance of the leading flag F is effected in the steps n32-n35.

If the transmission buffer C in the link controller 7 to which data is to be transferred is empty in a step n36, and when the link controller 7 issues a signal to the DMAC 3 for data transfer to the buffer C in a step 37, one-byte of data is transferred from the buffer B to the buffer C in a step n38. The link controller 7 also transfers data transferred to the buffer C to the shift register D in a step n39. If one-byte of data is transfered to the shift register D in a step n40, then the program goes back to the step n37 for DMA data transfer. The data in the shift register D is supplied to the line control circuit 8 in which the data is modulated, and the modulated data is delivered over the line in steps n41-n44. When the foregoing operation is effected in two or more terminals at the same time, a collision occurs when at least a source address of the data is delivered. If the collision is detected by the collision detector CO, then the program proceeds from the step n44 to a step n60 to prohibit data transmission. If there is no collision, then the link controller 7 successively transfers data from the buffer C to the shift register D, and issues the data transferred in the DMA mode to the buffer C successively to the line control circuit 8. The operation in the steps n37-n35 is repeated until data of the designated data length is delivered, whereupon the DMAC 3 informs the link controller 7 of the completion of frame delivery in a step n46 in response to the counting of all bytes in a byte counter in the DMAC 3. In response to the signal from the DMAC 3, the link controller 7 attaches a CRC (cyclic redundancy code) and completes transmission of one-frame data, and then issues an interrupt signal indicative of the completion of one-frame data transmission to the CPU 5 in a step n47. Furthermore, the link controller 7 instructs the line control circuit 8 to deliver the trailing flag F in a step n48. The trailing flag F is continuously delivered until the CPU 5 effects the processing of transmission completion in a step n49 and the processing of reception preparation in a step n50. When these processings are completed, the issuance of the flag is stopped in a step n51, and the interface is brought into a reception mode in a step n52.

As long as the trailing flag F is continuously transmitted as described above, the signal CD2 remains high and access from other terminals is prohibited. Since the signal CD1 is high while the terminal device N is receiving the trailing flag F, the terminal device N is in a condition for waiting for a response packet.

Operation in which data packets collide in the step n44 will be described.

Data packets collide with each other when two or more terminals simultaneously transmit data in a common-bus system in which the terminals have equal access capabilities. The signal CD2 prevents a collision when access timings are completely different. Since a propagation delay is large between mutually spaced terminals, it takes a long time to detect data transmission from another terminal, resulting in a greater tendency toward a collision. To solve this problem, it is general practice for a local network system employing a common bus to transmit a data packet once again some predetermined period of time after the collision has occurred, a process known as a back-off process. The procedure beginning with the step n60 is illustrative of this back-off process.

When any collision is detected by the collision detector CO, transmission of the data packet from the terminal is prohibited in the step n60. The line is rendered high in logic level for easy detection of a collision by another terminal in a step n61. Then, a negative-going edge of the signal CD2 is detected in a step n62, a prescribed back-off timer value is read out of the random-number table TBL in the memory 4 at the timing of the negative-going edge of the signal CD2 in a step n63, and the timer value readout from the table is set in a timer T in the control circuit 6 in a step n64. Upon elapse of the time thus set in a step n65, the CPU 5 detects the status of the signal CD2 again. If the level of the signal CD2 is low and accessible in a step n66, then the program returns to the step n30 to repeat the foregoing data transmission. If the level of the signal CD2 is high and the line cannot be used, then the program goes on to a step n67 in which the back-off timer is started at the timing of the negative-going edge of the signal CD2 (the step n64), and any low condition of the signal CD2 in which the time set by the timer elapses is awaited.

Figure 13:
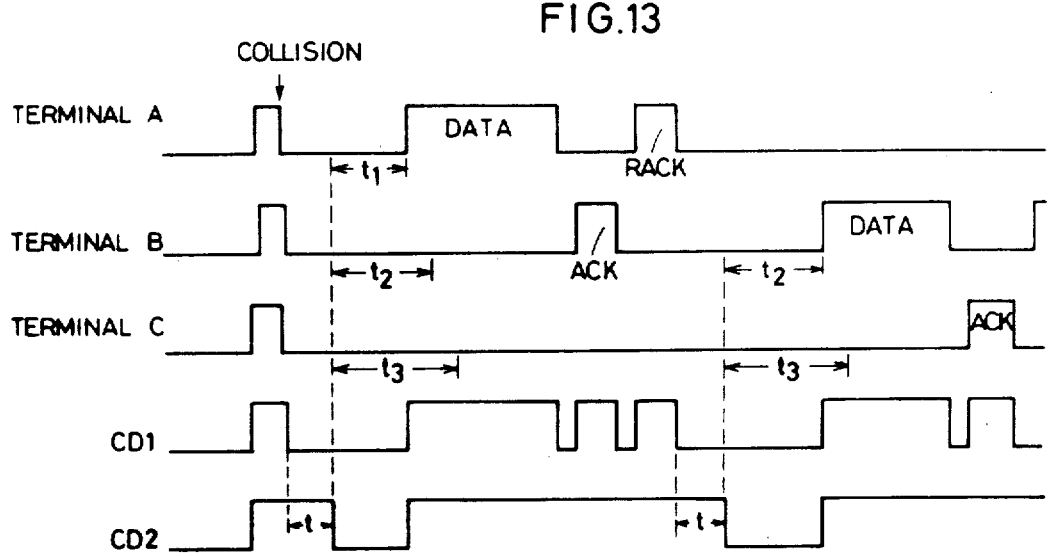
FIG. 13 is a timing chart showing operation at the time of a collision caused by a simultaneous access by terminals A, B and C.

FIG. 13 shows operation in which a collision occurs due to substantially simultaneous access by the terminals A, B and C (subject to small errors resulting from propagation delays and other causes). When the terminals A, B and C detect the collision as illustrated, the transmission is immediately interrupted, and back-off timer values t1, t2 and t3 are started which are generated by tables of random numbers in the respective terminals at the timing of a negative-going edge of the signal CD2. Upon elapse of the time t1, the terminal A detects the condition of the signal CD2. At this time, the terminals B, C cannot transmit data since the timer values t2, t3 have not yet elapsed. Therefore, retransmission from the terminal A is allowed since the signal CD2 is low unless there is access from another terminal. In the illustrated example, data packets are transmitted from the terminals A to B, the terminals B to C, and the terminals C to N. The terminals B and C which have failed to transmit data packets due to the collision retransmit them after the transmission from the terminal A has been successful. The data packet transmission from the terminals B and C is effected in the same manner as described above. More specifically, the timer values t2, t3 are started at the timing of a negative-going edge of the signal CD2. Upon elapse of the time t2, the terminal B checks the condition of the signal CD2 and retransmits the data packet if the signal CD2 is a low level. Likewise, upon elapse of the time t3, the terminal C checks the condition of the signal CD2 and retransmits the data packet if the signal CD2 is low in level. Data packets are thus successively transmitted from the terminals having collided with each other while effecting the back-off process.

With this embodiment, as described above, the time at which the back-off timer is started is selected in synchronism with a negative-going edge of the signal CD2 irrespective of the types of the terminals. This arrangement reduces the probability that a collision will occur again, and increases the accuracy of the back-off timers. Any back-off timer value set in the step n64 remains the same so that the same value will be set in the step n64 in a next cycle unless a new collision takes place.

Figure 14:
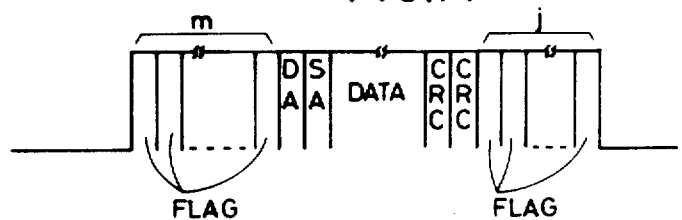
FIG. 14 is a diagram illustrating the arrangement of a data packet transmitted over a line.

The arrangement of a data packet delivered over the line in the foregoing operation is illustrated in FIG. 14.

As shown in FIG. 14, the data packet has m leading flags F at the leading end of the packet and j trailing flags J at the trailing end of the packet. As described above, the m flags are delivered in the steps n32–n35, and the j flags are delivered in the steps n48–n51. With the sucessive flags provided at the leading and trailing ends of the packet, the transmission terminal can be readied for data transmission while the trailing flags are being successively fed out, and the reception terminal can be brought into a proper reception mode while the leading flags are being successively received.

It is apparent from the steps n48–n51 that the transmission terminal can be readied for data transmission during the time in which the trailing flags are being successively fed out. During this time, access from any other terminal is inhibited by the high level of the signal CD2. The high level of the signal CD1 prohibits the transmission of an ACK packet from the terminal device N.

The reception terminal is brought into the proper reception mode in the following instance: when a reception terminal happens to receive data simultaneously from two or more transmission terminals, for example, a collision can be detected when a source address is received. At this time, the reception terminal has already received leading flags and an address of its own, and is waiting for data as the reception mode is not reset. However, the two or more transmission terminals which have caused the collision have interrupted their data transmission and are waiting for the next data transmission. When a new data packet is transmitted from one of these transmission terminals or another terminal, the reception terminal waiting for data regards the first leading flag of the incoming data packet as a trailing flag (the leading and trailing flags are of the same code "7E"). At the time the leading flag is received, the reception terminal detects the erroneous packet format since the format length is too short, and performs error processing. If there is only leading flag attached, then the reception terminal regards any data received after the error processing as having no leading flag, and tends to effect error processing.

With a suitable number of successive leading flags contained in a data packet, however, when a reception terminal receives a first leading flag, it performs error processing while subsequent leading flags are being received, and regards any successive flags as flags of a next succeeding packet when the reception terminal is in a proper reception mode.

Briefly summarized, transmission and reception terminals can be brought into a condition capable of properly receiving packets at all times by attaching m leading flags and j trailing flags to data packets.

Figure 11A:
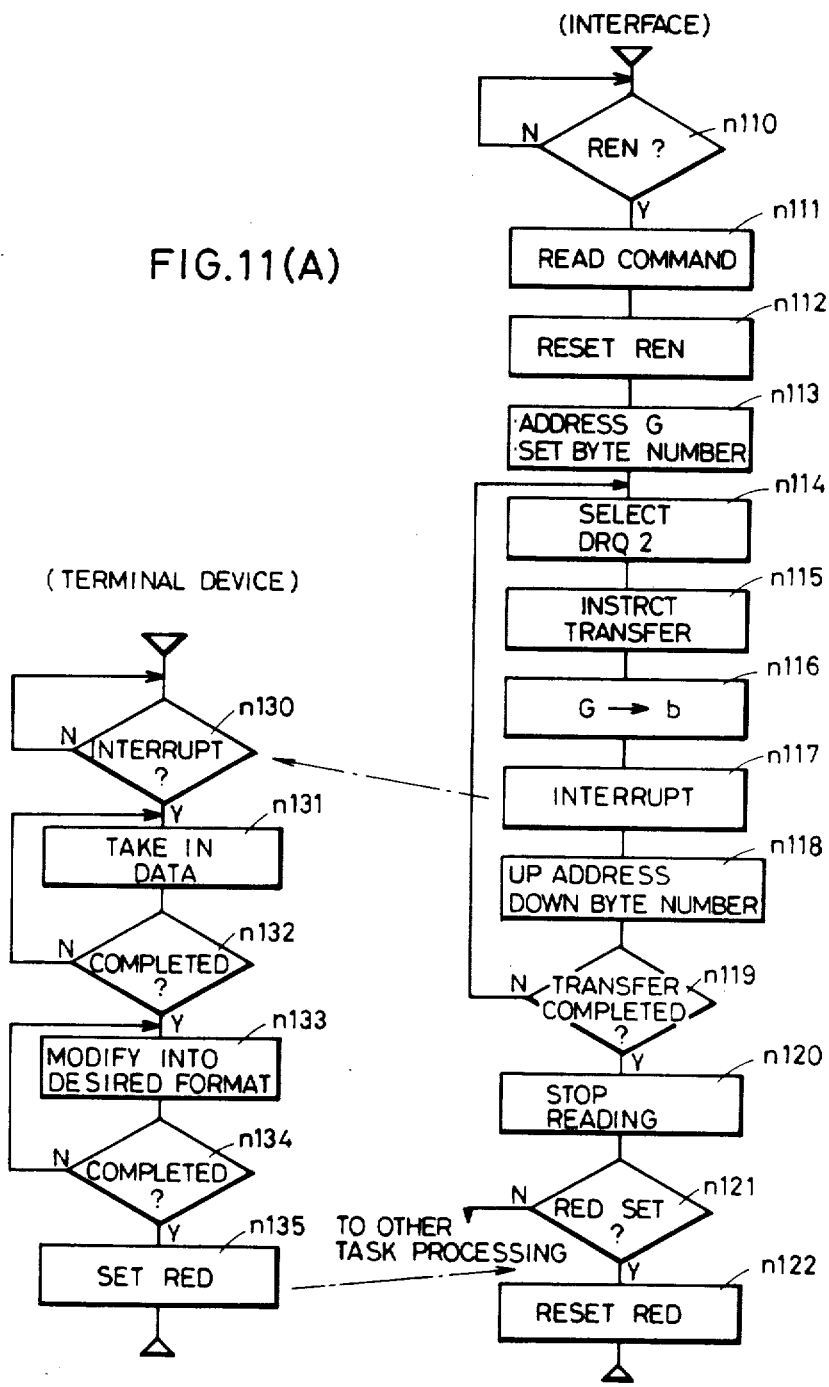
FIGS. 11(A) through 11(C) are a flowchart of operation of data reception.
Figure 11B:
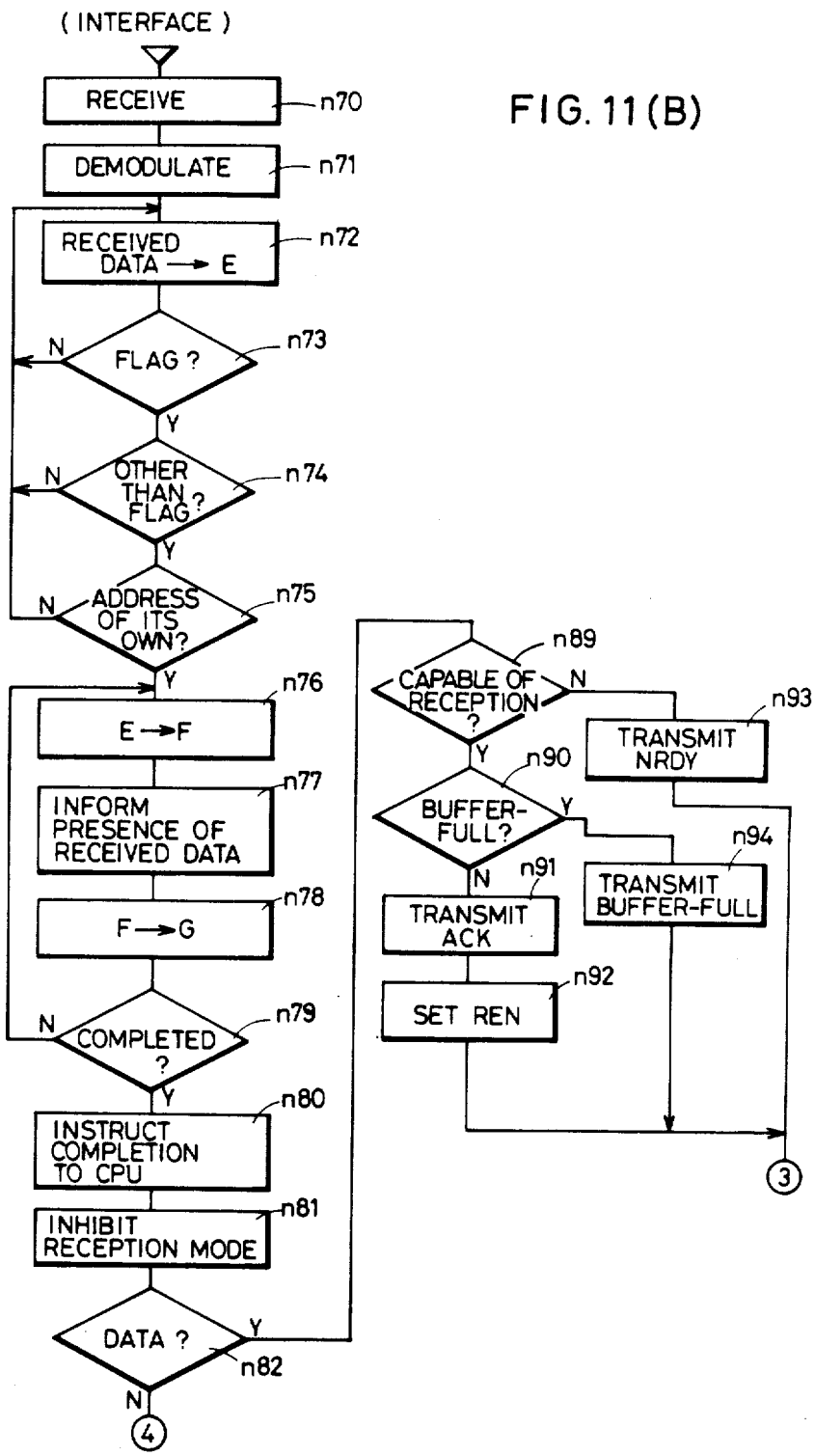
Figure 11C:
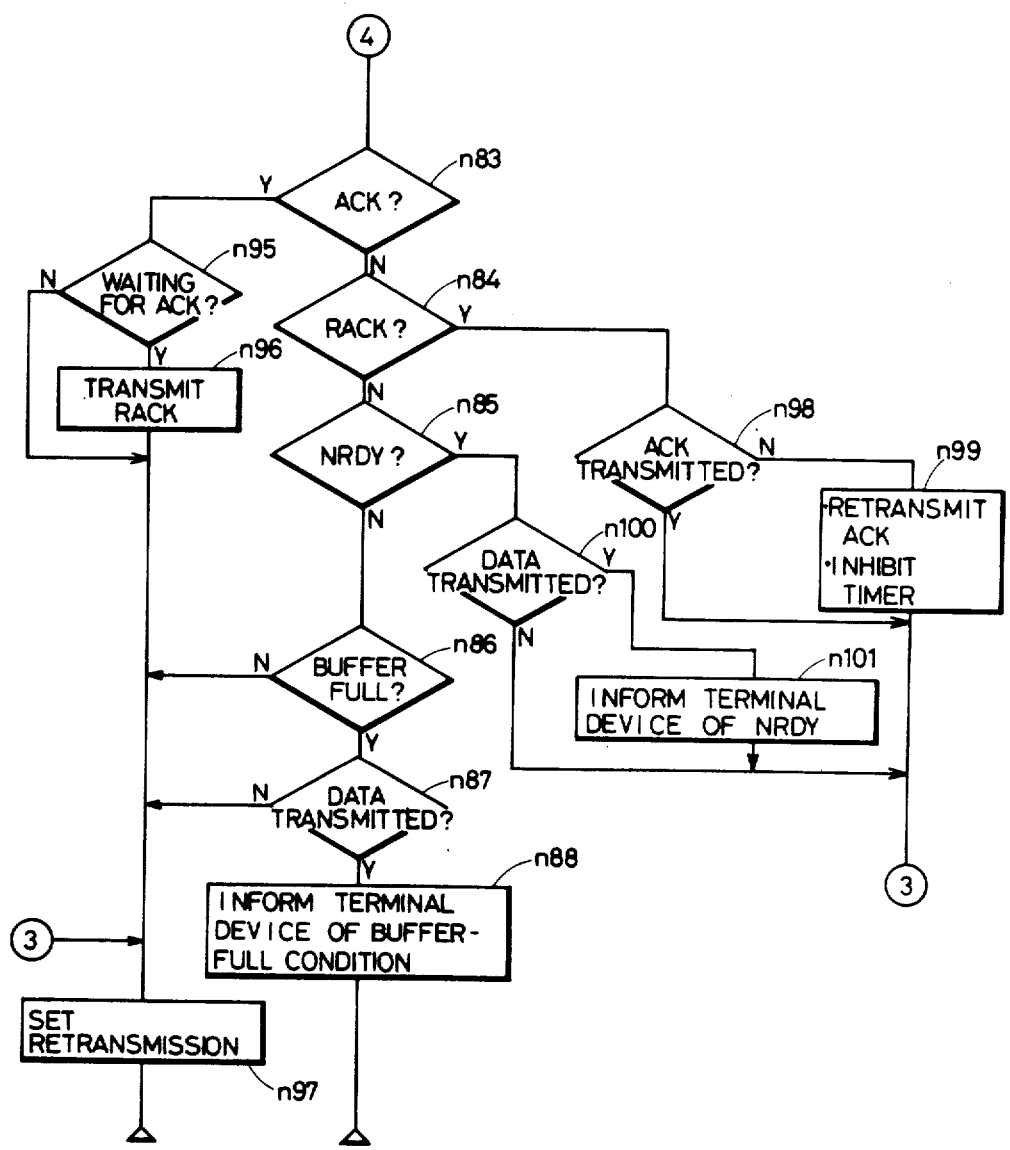
Figure 12:
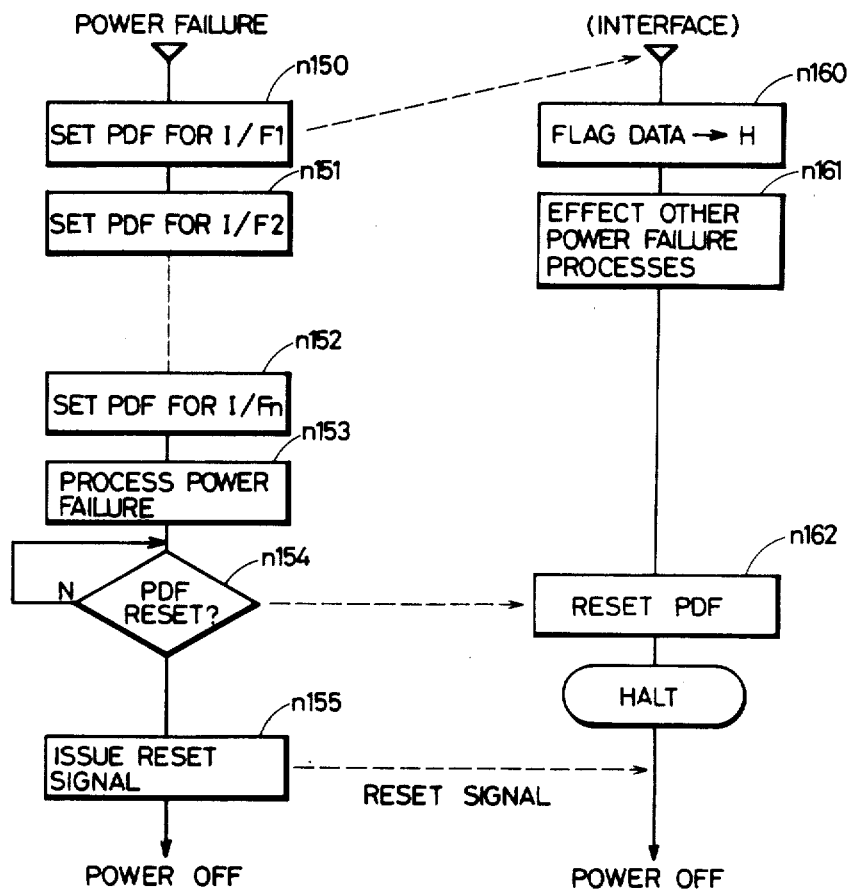
FIG. 12 is a flowchart showing a power-failure processing operation.

(2) Reception:

FIGS. 11(A)–11(C) are a flowchart showing operation of data reception.

A data packet delivered over the line in the foregoing manner is received by the line control circuit 9 for the terminal device N in a step n70, demodulated in a step n71, and led to the shift register E in the link controller 7 in a step n72. The link controller 7 determines whether the first one byte of the received data is a flag or not in a step n73. If it is a flag, then the next succeeding one-byte data is led to the shift register E. If not, then a destination address DA is read, and whether the destination address is an address of its own is determined in a step n75. If the destination address agrees with its own address, then the program goes on to a step n76 in which the received data in the shift register E is transferred to the reception buffer F. Then, an instruction indicating that there is received data is given to the DMAC 3 in a step n77. At the same time, DRQ 1 is selected as a channel for transferring the data to the buffer G. In response to the instruction, the DMAC 3 sucessively transfers the received data in the reception buffer F to the reception buffer in the memory 4. In this data transfer, the data led to the register E is transferred one byte after one byte. The data reception is judged as being completed when a trailing flag indicating the end of the data is detected in a step n79, and the link controller 7 instructs the CPU 5 to end the data reception in a step n80. In response to this instruction, the CPU 5 inhibits the reception mode and at the same time determines the kind of the data transmitted. If the transmitted data is data information, then whether the terminal device is ready for reception is determined by the flag in the memory 4 in a step 89. The flag is controlled by the terminal device and set when the terminal device is capable of data reception. If the terminal device is capable of data reception, then whether the reception buffer G (in the memory 4) in the designated channel (designated by CH. NO in FIG. 9) is empty or not is determined in a step n90. There are as many reception buffers G as there are channels. If the reception buffer for the channel designated in the step n90 is empty, then an ACK packet is transmitted to the terminal from which the data packet has been transmitted in a step n91. Although not shown in FIG. 11, the ACK packet is assembled by the CPU 5. As shown in FIG. 9, the ACK packet can be assembled with utmost ease, and the data other than the destination address DA are of fixed codes. It is not necessary to prepare the destination address itself, but the source address SA of the transmitted data packet can be used therefor. The ACK packet is transmitted when there is no carrier over the line L, that is, the signal CD1 is low in level. When the carrier detector CO detects any carrier, the terminal device is in a condition for waiting for transmitting the ACK packet in the step n91. While the trailing flag F is continuously transmitted from the terminal device A, the terminal device N is in a condition for waiting for the ACK packet in the step n91. After the ACK packet has been transmitted, the CPU 5 sets a data flag REN (of a specified channel) in the transmitted data transfer control circuit 2, and is set in a retransmission mode. At this time, data in the reception buffer is transferred to an area in the buffer G which corresponds to the channel number.

If the terminal device N is incapable of data reception in the step n89, then it transmits an NRDY packet in a step n93 and returns to a retransmission mode. If the reception buffer is full in the step n90, then the terminal device transmits a buffer-full (NRDY) packet in a step n94 and returns to a retransmission mode. At this time, transmission of the NRDY packet is performed after the trailing flag has been completely transmitted.

Although not shown, the trailing flag F is continuously transmitted until reception is ready for the ACK packet and the NRDY packet transmitted. As a result, the RACK packet from the terminal device A is transmitted when the terminal device N is completely readied for reception.

When the received data lacks any of the data, ACK, RACK, NRDY and buffer-full packets in the foregoing operation, such a condition is processed as an error. Therefore, when a collision of data packets occurs, data on the collision is received and then the leading flag F of the retransmitted packet is received, the received data is regarded as none of the foregoing data, and the program goes from the step n86 to a step n97 in which the terminal device is reset in a re-reception mode. Actually, a process for clearing the previously received data (one of the error processes) is effected when the program proceeds from the step n86 to the step n97. When a data packet is retransmitted after data packets have collided with each other, the first leading flag F of the retransmitted packet is received and thereafter error processing is carried out, and then a re-reception mode is established and a next packet is received in the step 70. Since there are successive leading flags F at the leading end of the retransmitted packet, these leading flags start being received in the step 70. Thus, the retransmitted packet is received in a proper format.

The terminal device A receives the ACK packet transmitted by the terminal device N in the foregoing step n91, and the program goes from the step n81 to the step n83 to a step n95. Since the terminal device A is normally brought into a condition for waiting for an ACK packet after the data packet has been transmitted, the program proceeds from the step n95 to the step n96 in which an RACK packet is transmitted to the ACK packet transmission terminal or the terminal device N. The transmission and reception control is set in a reception mode in a step n97.

The ACK packet transmission in the step n91 is controlled by a transmission timer T1. When the ACK packet transmission fails a predetermined number of times and no RACK packet can be received even if the ACK packet is transmitted a predetermined number of times, proper reception processing is initiated.

When the RACK packet is transmitted by the terminal device A, the program goes from the step n82 to the step n83 to the step n84 to a step n98 for the terminal device N. Since the transmission of the ACK packet is finished at the time the RACK packet is received when in a normal condition, the program goes from the step n98 to the step n97 in which a reception mode is established. When the RACK packet is received while no ACK packet is transmitted, the reception mode is set in the step n97. If the received packet is NRDY packet in the step n85, then the program goes from the step n85 to a step n100. Since the NRDY packet is normally received after the data packet has been transmitted, the program proceeds from a step n100 to a step n101 in which the terminal device is informed of the fact that the companion terminal device is in the NRDY condition (incapable of receiving data), and then the reception mode is established in the step n97.

The response packet is transmitted in the process beginning with the step n82 as described above. When a data packet is properly received and an ACK packet is transmitted, received data is transferred between the terminal devices through the transmitted and received data transfer control circuit according to a procedure beginning with a step n110.

In the step n110, the terminal device N checks whether there is a flag REN set or not which corresponds to a channel specified by a main CPU (not shown). If the flag REN corresponding to the specified channel is set, a received data read command is given to the received data control circuit 2 in a step n111. The flag REN is reset in a step n112, and the CPU 5 sets the head address of the buffer G (of the designated channer number) in the memory 4 and the received data length in the DMAC 3 in preparation for DMA transfer in a step n113. The CPU 5 also sets a channel (not the above designated channel, but a data transfer channel in the interface) used for data transfer in the DRQ 2 in a step n114, and commands DMA transfer in a step n115. Then, one-byte of data is transferred from the buffer G to the register b in a step n116, and an interrupt signal is issued to the terminal device N in a step n117. In response to the interrupt signal, the program goes from a step n130 to a step n131 for enabling the terminal device N to take in the data transferred to the register b. This operation is repeated until all of the data in the buffer G is taken in through the register b, whereupon the DMA transfer is completed, and the program goes from a step n119 to a step n120 in which the DMAC 3 stops operating.

The terminal device N checks whether the number of bytes of the received data agrees with the number of bytes of the data acually taken in. If they are in agreement, then the data is modified into a desired format in a step n133. After the data format modification has been completed in a step n134, the flag RED in the received data transfer control circuit 2 is set in a step n135, and the interface is informed of the completion of data reading. The CPU 5 in the interface detects setting of the flag RED in a step 121, resets the flag RED in a step n122, and is readied for transmitting next data received.

In the reception operation, the flag RED constitutes means for storing an interface control oondition in the terminal device. By setting the flag RED, a request for data transfer for a next block of data from the interface is permitted.

Particular data can be transmitted from the terminal device A to the terminal device N in the foregoing manner.

(3) Power-failure processing:

FIG. 12 is a flowchart showing operation during a power failure.

A power failure is detected by a terminal device. When a power failure is detected by a non-illustrated power-failure detector circuit, the terminal device successively informs the first interface to the nth interface of the power failure. More specifically, a flag PDF is set for the first interface in a step n150. Likewise, flags PDF are set for the second interface to the nth interface respectively in steps n151 to n152.

With the flag PDF being set, the interface executes a power-failure processing routine having a higher interrupt priority. In this routine, flags in the transmitted and received data transfer control circuits 1, 2 are saved in a area H in the memory 4. Then, other power-failure processes are effected in a step n161, and the flag PDF is reset in a step 162. Then, the program goes into a HALT mode.

The terminal devices set the flags PDF of all interfaces in a step n152, and then execute power-failure processes of their own in a step n153. After the power-failure processes have been completed, whether the flags PDF of all interfaces are reset is checked in a step n154. If all of the flags PDF are reset, then the program proceeds to a step 155 in which a reset signal is issued and the operation comes to an end. In the step 155, the terminal devices and all of the interfaces connected thereare are reset and the power is turned off.

When the power supply is restored, the flags stored in the area H are referred to and data transfer control is effected. At this time, the set condition of the flag WED is referred to in the transmission operation, and the set condition of the flag RED is referred to in the reception condition. That the flag WED is set is indicative of the completion of one-block data transfer as shown in FIG. 10(A). Thus, it indicates the occurrence of a power failure at the time one-block data transfer has been completed. When the flag WED is checked by the terminal device and is set at the time the power supply is restored, data of a next new block may be transferred. Coversely, when the flag WED is reset at the time the power supply is restored, the orginal one-block data is transferred once again.

That the flag RED is set is representative of the completion of one-block data transfer as shown in FIG. 10(A). As in the data transmission operation, when the flag RED is set at the time the power supply is restored, data of a next new block may be transferred. Conversely, when the flag RED is reset, the orignal block of data may be transferred.

With the foregoing arrangement, an interface control condition in a terminal device serving as a main system at the time of a power failure is saved in a battery-backed-up memory, and is at rest after the power-failure process of the interface and the power-failure process of the terminal device have been completed. This allows the terminal device and the interface to be matched in phase during an interval of time from a power failure to a power supply recovery.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A local network system comprising:
 a plurality of data processing means for processing data, each of said plurality of data processing means processing data that is to be transmitted to other ones of said data processing means and further processing data received from other ones of said data processing means;

transmission line means for providing a common data transmission path between each of said plurality of data processing means; and a plurality of data transmission control means, each one of said plurality of data transmission control means corresponding to one of said plurality of data processing means and being connected between said one of said plurality of data processing means and said transmission line means for controlling a flow of data to and from said one of said plurality of data processing means, said data transmission control means comprising, reception control means for determining a packet format of data that is received from said transmission line means and producing a response packet in accordance with the determination of said packet format of said data received from said transmission line means;

transmission control means for delivering data that is to be transmitted or said response packet in a prescribed packet format over said transmission line means; and transmission and reception control means for controlling a transfer of data, data that is to be transmitted and data that is received, between said reception control means, said transmission control means and said one of said plurality of data processing means;

wherein said reception control means includes a plurality of reception buffers for storing the received data according to one of a plurality of channel numbers, said one of said plurality of channel numbers being designated by a header in the prescribed packet format.

2. The local network system according to claim 1, wherein said transmission control means delivers data to be transmitted over the transmission line means in a prescribed packet format and also delivers said response packet in a prescribed packet format over the transmission line means within a fixed period of time after the data in the prescribed packet format has been transmitted.

3. The local network system according to claim 2, wherein said data transmission control means further comprises collision prevention means for inhibiting transmission of a new data packet until a period of time, longer than said fixed period of time, elapses, said period of time running from a time at which a carrier signal is detected as being present on said transmission line means to a time at which a carrier signal is not present on said transmission line means.

4. The local network system according to claim 3, wherein said data transmission control means further comprises back-off timer means for permitting retransmission of data packets when said collison prevention means stops inhibiting the transmission of a new data packet in accordance with a back-off timer value.

5. The local network system according to claim 4, further comprising a back-off timer starting means, connected to said back-off timer means in each of said plurality of data transmission control means, for simultaneously starting the running of said back-off timer means.

6. A local network system comprising:

a plurality of data processing means for processing data, each of said plurality of data processing means processing data that is to be transmitted to other ones of said data processing means and further processing data received from other ones of said data processing means;

transmission line means for providing a common data transmission path between each of said plurality of data processing means;

a plurality of data transmission control means, each one of said plurality of data transmission control means corresponding to one of said plurality of data processing means and being connected between said one of said plurality of data processing means and said transmission line means for controlling a flow of data to and from said one of said plurality of data processing means, said data transmission control means comprising, reception control means for determining a packet format of data that is received from said transmission line means and producing a response packet in accordance with the determination of said packet format of said data received from said transmission line means;

transmission control means for delivering data that is to be transmitted or said response packet in a prescribed packet format over said transmission line means; and transmission and reception control means for controlling a transfer of data, data that is to be transmitted and data that is received, between said reception control means, said transmission control means and said one of said plurality of data processing means; and power-failure processing means for processing information upon a detection of a power-failure by each of said plurality of data processing means or when a power supply is restored, said power-failure processing means comprising, control information storing means for storing the control condition of said data transmission control means in said data processing means;

battery back-up storing means for storing the control information stored in said control information storing means when a power-failure is detected;

power-failure processing completion determining means for determining the completion of power-failure processing of said data transmission control means after the power-failure processing in said data processing means has been completed; and means for resetting said data processing means and said data transmission control means when the completion of power-failure processing is determined by said power-failure processing completion determining means; wherein said control information storing means and said battery back-up storing means are provided in said data transmission control means, and said power-failure processing means and said resetting means are provided in said data processing means.

7. A data transmission control apparatus for interfacing a terminal device to a local network system that includes a plurality of terminal devices that share a common transmission line, comprising:

reception control means for determining a packet format of data received from the transmission line and producing a response packet in accordance with the determination of said packet format of data received from the transmission line;

transmission control means for delivering data that is to be transmitted or said response packet in a prescribed packet format over said transmission line means; and transmission and reception control means for controlling a transfer of data, data that is to be transmitted and data that is received, between said reception control means, said transmission control means and the terminal device, wherein said reception control means includes a plurality of reception buffers for storing the received data according to one of a plurality of channel numbers, said one of said plurality of channnel numbers being designated by a header in the prescribed packet format.

8. The apparatus according to claim 7, wherein said transmission control means delivers data to be transmitted over the common transmission line in a prescribed packet format and also delivers said response packet in a prescribed packet format over the common transmission line within a fixed period of time after the data in the prescribed packet format has been transmitted.

9. The apparatus according to claim 8 wherein said data transmission control means further comprises collision prevention means for inhibiting transmission of a new data packet until a period of time, longer than said fixed period of time, elapses, said period of time running from a time at which a carrier signal is detected as being present on the common transmission line to a time at which a carrier signal is not present on the common transmission line.

10. The apparatus according to claim 9, wherein said data transmission control means further comprises back-off timer means for permitting retransmission of data packets when said collision prevention circuit stops inhibiting the transmission of a new data packet in accordance with a back-off timer value.

* * * * *